Nov. 7, 1967   W. G. SCOTT   3,351,855
TACHOMETER ATTACHMENT FOR CLAMP-ON
TYPE ELECTRIC METER

Filed Sept. 8, 1964   4 Sheets-Sheet 1

INVENTOR.
WILLIAM G. SCOTT
BY Toulmin & Toulmin
ATTORNEYS

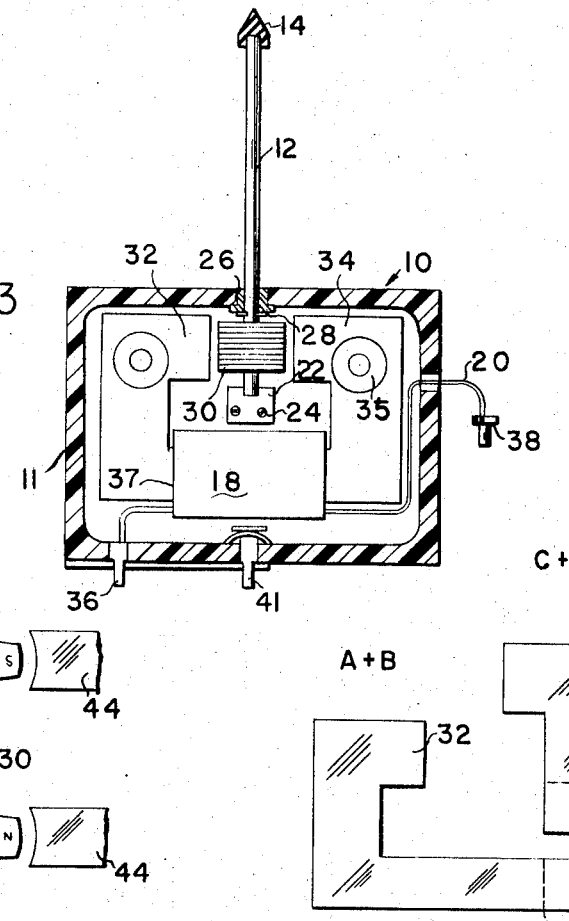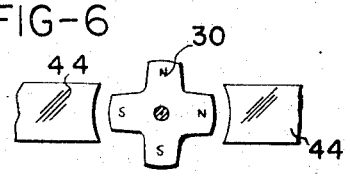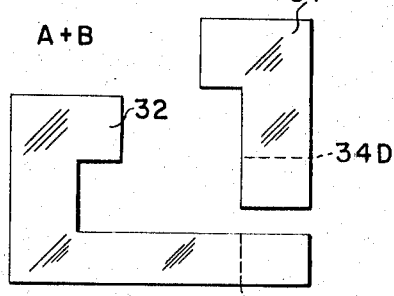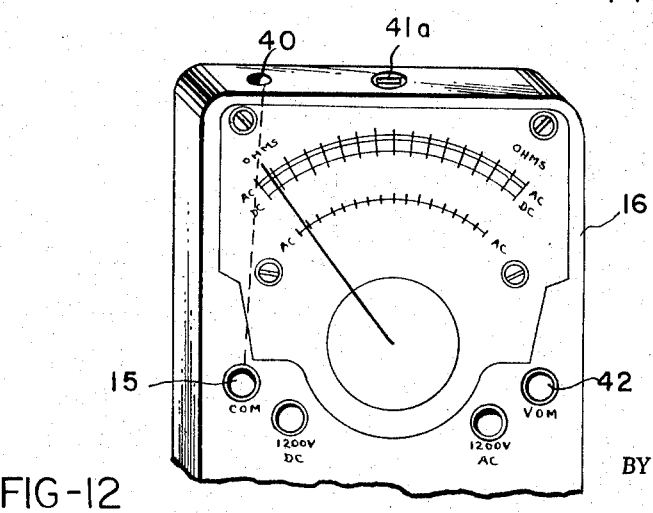

Nov. 7, 1967  W. G. SCOTT  3,351,855
TACHOMETER ATTACHMENT FOR CLAMP-ON
TYPE ELECTRIC METER
Filed Sept. 8, 1964  4 Sheets-Sheet 4

INVENTOR.
WILLIAM G. SCOTT
BY
*Toulmin & Toulmin*
ATTORNEYS

United States Patent Office 3,351,855
Patented Nov. 7, 1967

3,351,855
TACHOMETER ATTACHMENT FOR CLAMP-ON TYPE ELECTRIC METER
William G. Scott, Bluffton, Ohio, assignor to The Triplett Electrical Instrument Co., Bluffton, Ohio, a corporation of Ohio
Filed Sept. 8, 1964, Ser. No. 394,894
6 Claims. (Cl. 324—70)

ABSTRACT OF THE DISCLOSURE

Tachometer device in which a magnetized rotor is arranged to be removably disposed between the ends of the legs of a clamp-on transformer core, said core having a coil thereon with terimnals, and an AC-DC general purpose indicating instrument arranged for detachable supporting connection to the transformer core and having terminals for connection to the terminals of said coil.

---

This invention relates to tachometers and more particularly it relates to tachometer attachments which are adapted to be used in conjunction with existing electrical measuring instruments.

Prior electrically operated tachometers exist, however, applicant knows of no such construction which utilizes existing electrical measuring instruments as here presented to provide a high degree of versatility to existing electrical testing equipment at an economical cost.

A primary object of this invention is to provide an economical and simple tachometer attachment which can be used with existing electrical measuring instruments.

Another object of this invention is to provide a housing for the tachometer attachment which may be readily attached to existing electrical measuring instruments and which housing is adapted to receive a variety of clamp-on AC ammeters.

There are two general embodiments of this invention. One embodiment utilizes a housing in which a magnetic rotor is mounted having a shaft extending therefrom which is brought in contact with the rotating member whose rotational speed is to be determined. The magnetic rotor changes the flux in a magnetic yoke member in the housing and generates an EMF in a coil mounted on yoke. The output of the coil is connected to a standard volt-ohm millimeter to which the housing is conveniently connected.

A second embodiment utilizes a special housing in which a magnetic rotor is mounted to rotate with the rotating member whose rotational speed is to be determined. The housing is adapted to receive a split transformer yoke of a standard clamp-on ammeter and the clamp jaws of the clamp-on ammeter are positioned adjacent to the magnetic rotor, which in rotating, induces an EMF in the coil of the ammeter which is fed into a standard volt-ohm millimeter where the AC voltage is correlated to rotational speed.

The advantages of this construction will become apparent upon reading the following specification and drawings in which:

FIGURE 3 shows a modified plan view of the tachometer attachment shown in FIGURE 1;

FIGURE 4 shows the construction of the laminations of the magnetic yoke used in FIGURE 3;

FIGURE 5 shows one arrangement of the magnetic pole on the magnetic rotor;

FIGURE 6 shows another arrangement of the magnetic poles on the magnetic rotors;

FIGURE 12 shows the electrical contact receptacle on a standard volt-ohm milliammeter;

Figures 1, 2:
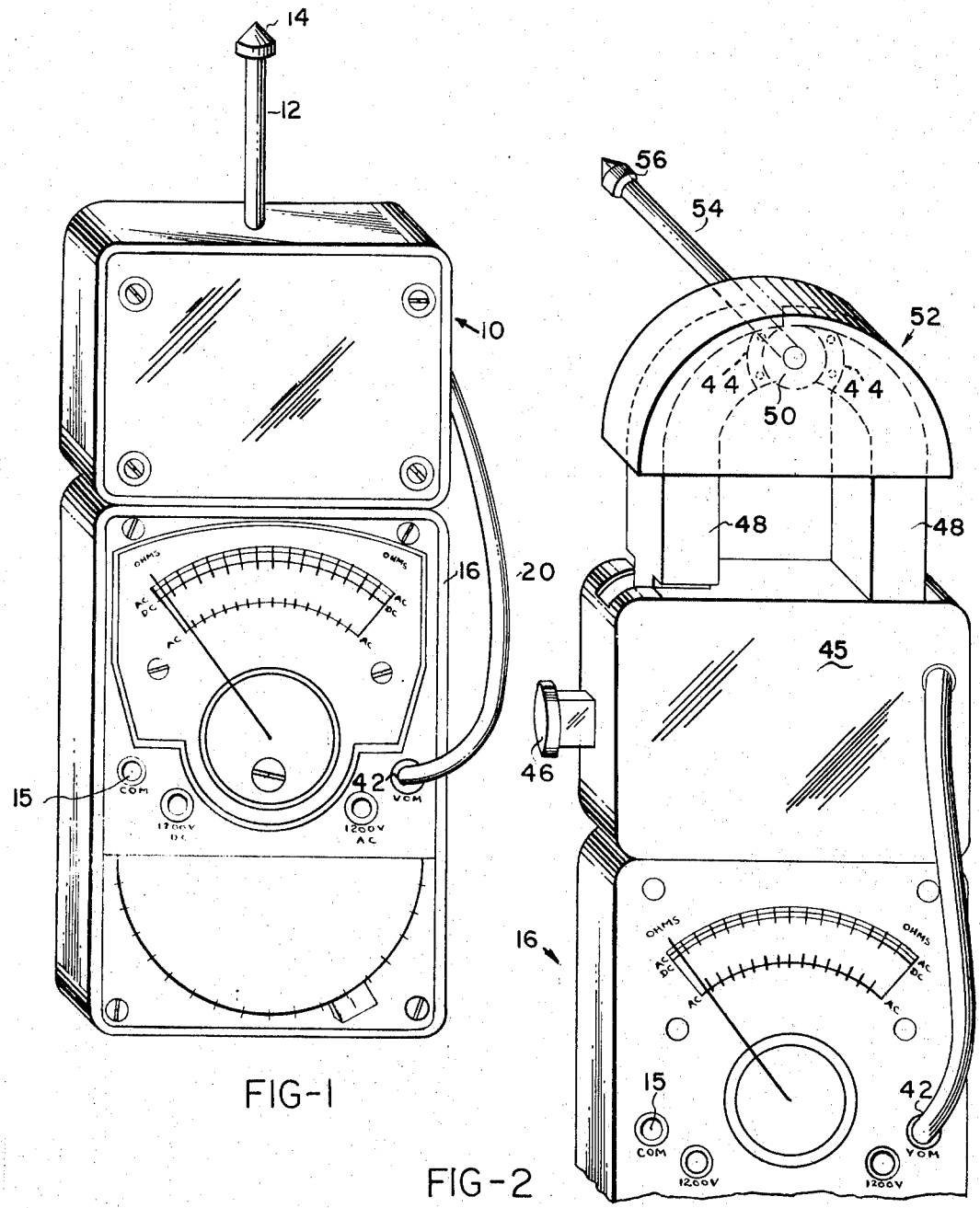
FIGURE 1 is a perspective view of one embodiment of this invention in which the tachometer attachment is attached to an existing standard volt-ohm milliammeter.
FIGURE 2 shows a second embodiment of this invention in which the tachometer attachment is used in conjunction with an existing clamp-on AC ammeter and a standard volt-ohm milliammeter.

Referring to the drawings more in detail, FIGURE 1 shows the tachometer attachment 10 having a shaft 12 extending therefrom. Shaft 12 is rotatably mounted in the attachment and has a rubber tip 14 on the end thereof adapted to contact the rotating member whose rotational speed is to be determined. The tachometer attachment 10 is shown positioned on a standard volt-ohm milliammeter 16, such as the Triplett Model 310. The tachometer attachment has a coil 18 therein and one end of the coil is connected to the common terminal 15 of the milliammeter by means to be later described, and the other lead 20 is attached to the volt-ohm milliammeter as shown.

In the particular embodiment developed, the three volt AC range was used to determine the r.p.m. reading. The correlation between voltage and r.p.m. was established in known manner.

FIGURE 3 shows the details of construction of the tachometer attachment 10. It consists of a Bakelite housing 11 or other suitable material in which the probe shaft 12 is rotatably mounted. The end of the probe shaft 12 is received in a bearing block 22 which is suitably fastened to the housing 11 by screws 24.

A suitable bushing type bearing 26 is provided at the forward end of the shaft and a C-ring 28 is used to suitably retain the shaft in the housing.

In the specific embodiment of this invention the magnetic rotor 30 consists of 10 laminations of .040" cunife magnetic material stacked together and which are attached to the shaft 12 by known means to rotate therewith. The magnetic rotor could also be solid magnetic material with no laminations. The arrangement of the magnetic poles of the rotor 30 is shown in FIGURES 5 and 6.

While cunife magnetic material was used for the rotor, which is of the 4-pole variety, it is understood that other magnetic material may be employed.

The magnetic yoke used in the FIGURE 3 construction consists of a plurality of laminations 32, such as A and B, with the B lamination being cut off at 32B as shown, and laminations 34 comprising C and D laminations, with D lamination being cut off at 34D as shown. The number of laminations used are determined in known manner and they are interleaved in known manner and are suitably fastened in housing 11 by fastener means 35.

The coil 18 having a suitable number of turns thereon which are determined in known manner, is shown mounted on the magnetic yoke 37 in FIGURE 3. One of the leads from the coil 18 is connected to terminal 36 and the other lead is connected to lead 20. A suitable jack 38 on lead 20 enables the coil to be connected to the volt-ohm milliammeter 42 as shown in FIGURE 1.

FIGURE 12 shows the top portion of a standard V-O-M having an electrical receptacle 40 into which terminal 36 is inserted when the housing 11 is positioned on the ammeter, as shown in FIGURE 1, and a conductor joins receptacle 40 with the common terminal 15.

Figure 13:
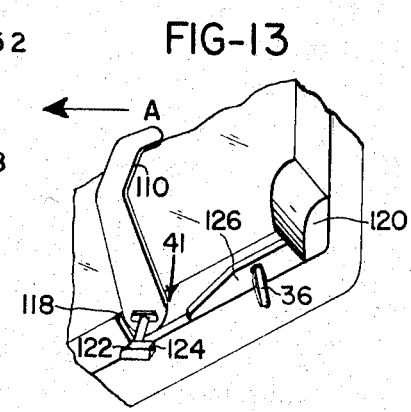
FIGURE 13 shows the underside of the housings in perspective in which the means for locking the housings to the volt-ohm milliammeter is shown.
Figure 14:
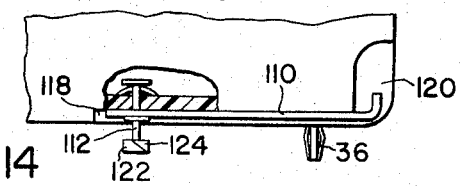
FIGURE 14 shows a side view of the means for locking the housing shown in FIGURE 13.

The housing 11 also has a locking member generally designated 41 which fits into a mating rectangular female recess plug member 41a to lock the housing attachment 11 on the meter 16 as shown in FIGURE 1. The same general arrangement is used on the embodiment shown in FIGURE 2 and the details of the locking member are shown in FIGURES 13 and 14.

The jack 38 is then appropriately inserted in V-O-M receptacle 42. The magnetic yoke shown in FIGURE 3 has arcuately shaped pole faces 44 as shown in FIGURES 5 and 6.

Referring to the second embodiment of this invention which is shown in FIGURE 2, there is a standard V-O-M 16 having a standard clamp-on AC ammeter 45 positioned thereon. This ammeter may be of the Triplett Model 10 variety, and has a lever 46 thereon which is used to open the jaws 48 of a split transformer yoke.

The jaws 48 open to be positioned around the magnetic rotor 50 which is rotatably mounted in the housing 52. The magnetic rotor 50 rotates with shaft 54 which has a rubber tip 56 thereon for engagement with the rotating body whose rotational speed is to be determined.

Figure 7:
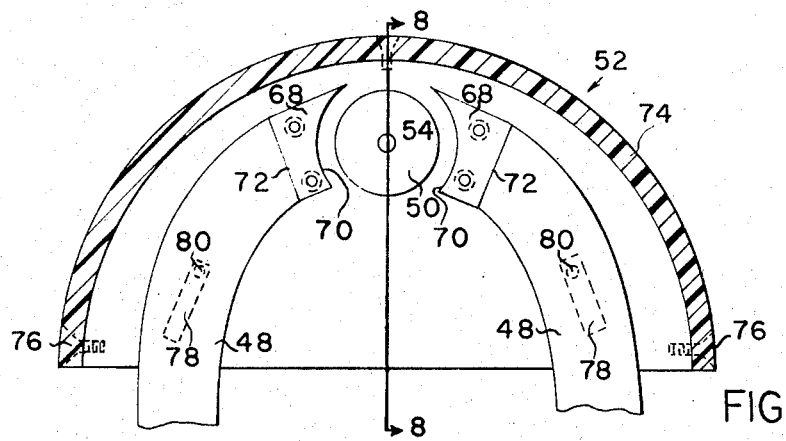
FIGURE 7 is a modified view of FIGURE 8 looking in the general direction of A on FIGURE 8 showing the tachometer housing of the second embodiment of this invention.
Figure 8:
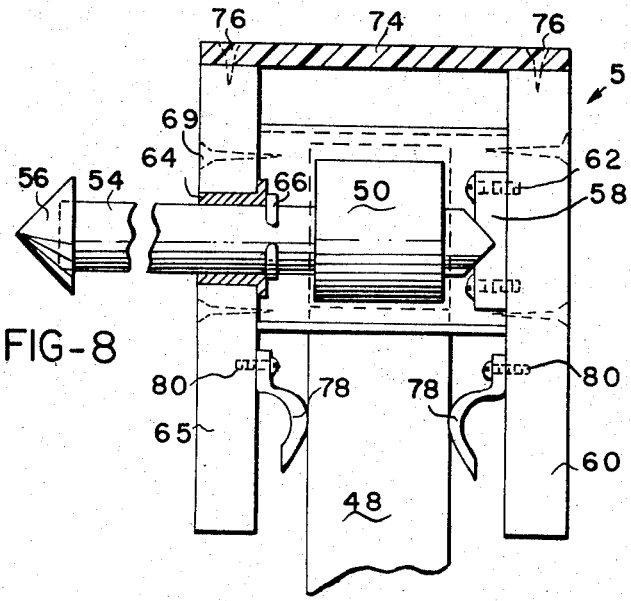
FIGURE 8 is a modifieed view taken along lines 8—8 of FIGURE 7.

FIGURES 7 and 8 show the details of the tachometer attachment shown in FIGURE 2. The shaft 54 has one end rotatably mounted in bearing block 58 which is suitably fastened to side plate 60 of the tachometer housing 52 by screws 62. The shaft is also rotatably supported in bushing 64 which is mounted in the other side plate 65. A suitable C-ring 66 is inserted in a cooperating recess on shaft 54 to retain the shaft in the housing 52.

Adjacent to the magnetic rotor 50, there are pole pieces 68 which are suitably retained in the side plates 60 and 65 by fasteners 69. These pole pieces have arcuately shaped faces 70 which are suitably spaced from the rotor 50.

Opposite from the pole faces 70 are sides 72 which are cut at an angle to insure the flush contact with the jaws 48. The pole pieces 68 may be made of laminated material or may be solid ferrous material.

The housing 52 also has a cover 74 which is suitably secured to the side plates 60 and 65 by screw means 76. In order to retain the jaws 48 in the housing there are spring members 78 which are suitably secured to their respective side plates by fasteners 80. The jaws 48 may have indents (not shown) thereon into which the spring members 78 slide when the jaws are in the position shown in FIGURES 7 and 8.

When the tachometer attachment shown in FIGURE 2 is used, the rotor 50 rotates and an EMF is induced in the coil of the standard clamp on AC ammeter 45 and the AC voltage is read on the AC scale as shown in FIGURE 2.

The r.p.m. can be correlated to the zero to 3 volt AC scale, for example. The clamp-on ammeter 45 is electrically connected to the V-O-M in the same manner as was the tachometer attachment 10 connected to the V-O-M. For those clamp-on ammeters which do not have the means for attaching the clamp-on unit directly to the ammeter, as shown herein, the two leads from the clamp-on ammeter may be suitably inserted in the terminals 15 and 42. The AC meter could be a rectifier type or iron vane type. Also the tachometer attachment can be used with long leads to the V-O-M in places where meter attached to tachometer would be difficult to read.

Figure 9:
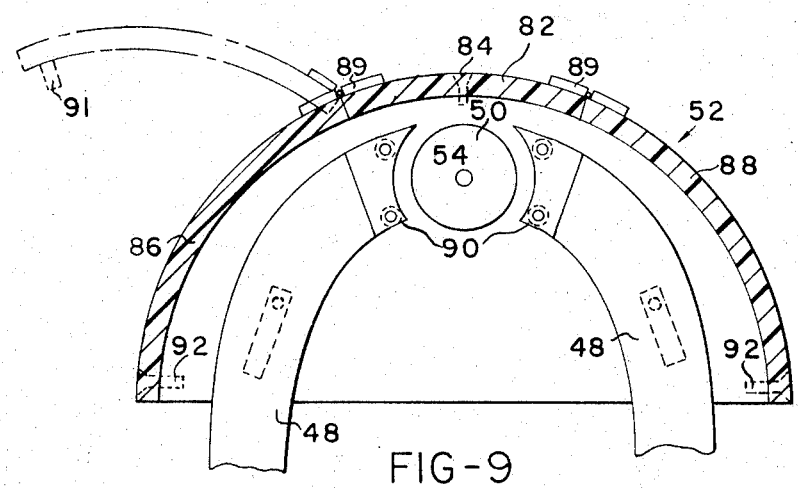
FIGURE 9 shows a modification of the tachometer housing shown in FIGURES 7 and 8.
Figure 10:
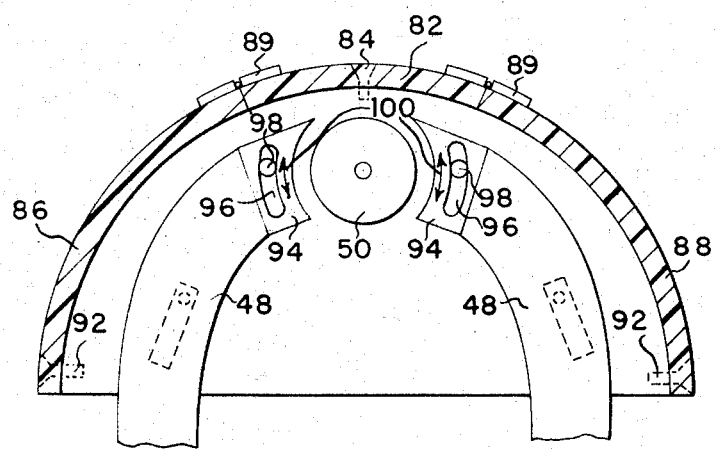
FIGURE 10 shows an arrangement for adjusting the pole faces of the tachometer attachment shown in FIGURES 7-9.

In order to adapt the tachometer attachment shown in FIGURE 2 for use with clamp-on ammeters other than the Triplett Model 310 and Model 10 combination mentioned earlier, the housing 52 is modified somewhat, as shown in FIGURES 9 and 10. The top cover portion 82 is fixed to side plates 60 and 65 by screw member 84. The top cover 82 has hinge members 86 and 88 which are secured to the top section 82 by hinges 89 as shown in FIGURE 9.

In order to insure sufficient clearance in the housing for attaching the jaws 48 around the pole pieces 90, the hinge portions 86 and 88 can be raised to the dashed position shown. This will provide sufficient clearance for the jaws of different make clamp-on ammeters to be inserted therein. The hinge members 86 and 88 have known snap-in members 91 which are suitably retained in the cooperating female recesses 92.

FIGURE 10 shows a modification of the FIGURE 9 construction in which the pole pieces 94 are adaptable to be adjusted in order that the jaws 48 of the clamp-on ammeters may have a suitable face to face contact with the pole faces. Pole pieces 94 have arcuately shaped recesses 96 therein. There are suitable screws 98 which lock the pole faces in position after adjustment. The pole faces 94 are adjusted along a direction as shown by arrow 100, which direction is concentric with rotor 50.

Figure 11:
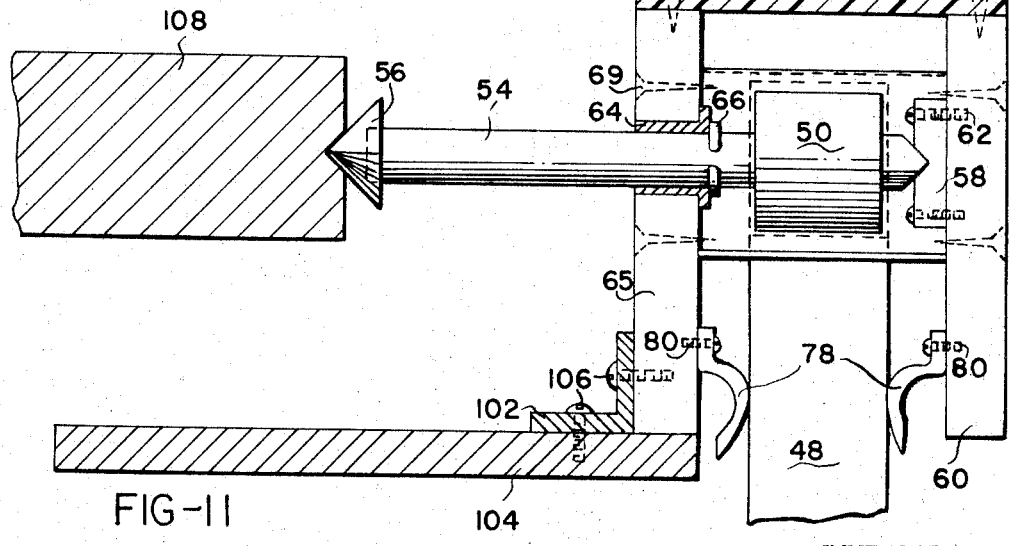
FIGURE 11 shows a construction in which the tachometer attachment is permanently fixed to a machine.

FIGURE 11 shows a construction in which the tachometer attachment shown in FIGURE 8 is permanently installed in a machine, for example. The installation includes a bracket member 102 which is secured to a supporting member 104 of the machine and side plate 65 by screw means 106. The rubber tip 56 of shaft 54 is in engagement with a rotating member 108 whose rotational speed is to be determined.

Whenever it is necessary to obtain the r.p.m. of the machine shown in FIGURE 11 all that would be necessary is to attach the clamp-on ammeter 45 to a V-O-M, as shown in FIGURE 2, and then insert the jaws 48 of the ammeter 45 around the pole pieces to obtain the reading.

In places where reading the meter while attached to the tachometer attachment would be difficult, long leads to the meter can be used with the attachment.

In the attachment shown in FIGURE 3, the one end of coil 18 which is connected to terminal 36 could be connected instead to another jack such as 38, and the two jacks with long leads could then be connected to suitable receptacles on the reading meter.

FIGURES 13 and 14 show the locking member 41 for locking the attachments 10 and the clamp-on ammeter 45 to the V-O-M. It includes lever 110 which is pivotally mounted in the case 11, for example, by a pin 112 which has a head 114 under which a spring washer 116 is located as shown in FIGURE 3.

The lever 110 is secured to the pin 112 outside the case as by crimping or welding and the lever abuts against a shoulder 118 in the unlocking position as shown in FIGURE 13 and the lever fits into corner recess 120 in the locking position shown in FIGURE 14.

The pin 112 which rotates with lever 110 has a rectangularly shaped lug 122 on the end thereof which fits into plug member 41a which is threaded into the meter case and has a mating rectangular recess therein.

Figure 15:
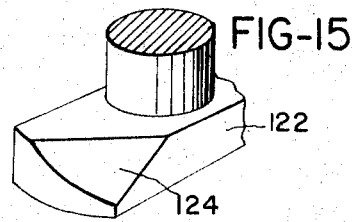
FIGURE 15 is a perspective view of the locking lug of FIGURES 13 and 14.

To affix the attachment to the meter case, the lever 110 is placed in the position shown in FIGURE 13 in which position the lug 122 is in alignment with the recess in 41a. Terminal 36 is simultaneously inserted in recess 40 and the lever 110 is moved towards the recess 120 to move the lug member about 90° to cause it to be retained in the plug member 41a. There are suitable chamber or cam surfaces 124 on the lug member (see FIGURE 15) to enable it to readily engage the underside of plug member 41a. To remove the attachment, the lever is simply moved from the shoulder 126 against which it abuts in the locked position to the position shown in FIGURE 3.

Another feature of the present invention is that lead 20 of the FIGURE 3 embodiment could connect to pin 112 of the locking lever, and the plug member 41a could be internally connected to the V-O-M terminal 42 by a conductor. In this manner the attachment 10 would be directly electrically connected to the meter 16 without the need of plug-in member 38.

It is to be understood that the tachometer attachment is, basically, a current transformer arangement and that by using the attachment without the rotor, AC currents can readily be measured.

It will be understood that this invention is susceptible to modification in order to adapt it to different usages and conditions; and accordingly, it is desired to comprehend such modifications within this invention as may fall within the scope of the appended claims.

What is claimed is:

1. In combination; an AC-DC volt-ohm-ammeter and a clamp-on type split transformer yoke having a coil wound thereon and a tachometer attachment comprising; a housing having spaced parallel side walls, magnetic spacer members positioned between said side walls and secured thereto to maintain said side walls in spaced relation, magnetic rotor means rotatably mounted in said side walls and positioned between said spacer members to rotate therebetween, said magnetic rotor means having at least two magnetic poles thereon, shaft means connected with said rotor means and extending from said housing for coupling said rotor means to a rotating body whose rotational speed is to be measured, said housing having an open end to receive the said split transformer yoke to enable the jaws thereof to be positioned adjacent to the said spacer members to be influenced by the rotation of said rotor means, the coil on said clamp-on type transformer yoke having first and second output leads, said AC-DC volt-ohm-ammeter and said clamp-on type transformer yoke having means thereon to detachably secure them together, said AC-DC volt-ohm-ammeter having a case and an electrical common receptacle therein, said clamp-on type transformer yoke having a case and an electrode extending therefrom which is connected to said first output lead and which electrode is inserted in said receptacle, said receptacle and said second output lead being connected to terminals of said AC-DC volt-ohm-ammeter to read AC volts for indicating rotational speed of said rotating body.

2. The combination as claimed in claim 1 in which the said spacer members are adapted to be adjustably positioned between said side walls to insure face to face engagement thereof with the jaws of said split transformer yoke, said housing also having a closed end which has hinged sections detachably secured to said side walls to facilitate the entry of said jaws to be positioned adjacent to said spacer members.

3. A tachometer attachment for use with an AC voltmeter and a clamp-on type split transformer yoke having a coil thereon comprising; a housing having spaced parallel side walls, magnetic spacer members positioned between said side walls and detachably secured thereto to maintain said side walls in spaced relation, magnetic rotor means rotatably mounted in said side walls and positioned between said spacer members to rotate therebetween, said magnetic rotor means having at least two magnetic poles thereon, shaft means connected with said rotor means and extending from said housing for coupling to a rotating body whose rotational speed is to be measured, said housing having an open end to receive the said split transformer yoke to enable the jaws thereof to be positioned adjacent to the said spacer members to be influenced by the rotation of said rotor means, said spacer members being adapted to be adjustably positioned between said side walls to insure face to face engagement thereof with the jaws of said split transformer yoke, said housing also having a closed end which has hinged sections detachably secured to said side walls to facilitate the entry of said jaws into said housing for said jaws to be positioned adjacent to said spacer members.

4. A tachometer attachment for use with an AC voltmeter means comprising; housing means having an opening therein, magnetic rotor means rotatably mounted in said housing means and having at least two opposite magnetic poles thereon, magnetic members permanently mounted in said housing means on opposite sides of said rotor means so as to be influenced magnetically by the rotor means as the rotor means rotates, the sides of said magnetic members adjacent the latter being curved to fit close about said rotor, shaft means connected with said rotor means and extending from said housing for coupling said rotor means to a rotating body whose rotational speed is to be measured, a clamp-on type transformer core means having legs adapted selectively to be inserted in the opening in said housing means with the ends of said legs positioned against the outer sides of said magnetic members, whereby said core means also can be influenced magnetically by rotation of said rotor means, said transformer core means engaging and supporting said housing means when positioned therein while said transformer core means is separable from said housing means to permit use of the transformer core means in a conventional manner, and coil means mounted on said core means so that said coil means has an AC voltage induced therein when the rotor means rotates which is proportional to the rotational speed of said rotor means, said coil means having two terminals adapted for connection to an AC voltmeter means for indicating rotational speed.

5. In combination, an AC voltmeter and a tachometer attachment, said tachometer attachment comprising; housing means having an opening formed therein, magnetic rotor means rotatably mounted in said housing means and having at least two opposite magnetic poles thereon, shaft means connected with said rotor means and extending from said housing for coupling said rotor means to a rotating body whose rotational speed is to be measured, magnetic members permanently mounted in said housing means on opposite sides of said rotor means and having outer sides facing away from said rotor means, clamp-on type transformer core means having legs adapted to be inserted into said opening in said housing means positioned with the ends of the legs in engagement with the outer sides of said magnetic members so the core means will be magnetically influenced by the rotation of said rotor means, said transformer core means engaging and supporting said tachometer attachment when said legs are positioned in said housing means and in engagement with said magnetic members, and coil means mounted on said core means so an AC voltage is induced therein when said rotor means rotates which is proportional to the rotational speed of said rotor means, said transformer core means being separable from said housing for use of the transformer core means in a conventional manner, said coil means having two output leads adapted for connection to the terminals of said meter to read AC volts for indicating said rotation speed, and means for detachably supporting said meter on said transformer core means.

6. A tachometer attachment for use with an AC voltmeter comprising; a housing having opposite parallel side walls and enclosing peripheral wall with an opening therein, magnetic rotor means mounted in said housing for rotation on an axis perpendicular to said side walls and having at least two opposite magnetic poles thereon, shaft means connected with said rotor means and extending from said housing for coupling said rotor means to a rotating body whose rotational speed is to be measured, a magnetic member permanently mounted in the housing between said side walls on each side of said rotor means, clamp-on type transformer core means having separable legs projecting therefrom adapted for insertion into the opening of the peripheral wall of said housing and end partitions on said legs adapted for clamping against the outer sides of said magnetic members so as to support the said housing on the transformer core means while placing said rotor means and said magnetic members in the magnetic circuit formed by said core means, means on the insides of said side walls for engagement with the sides of said legs to align the legs with said magnetic members, and coil means mounted on said core means so that an AC voltage is induced therein when said rotor means rotates which is proportional to the rotational speed of said rotor means, said coil means having two output leads for connection to an AC voltmeter so that the rotational speed of said rotor means and, therefore, that of said rotating body can be indicated by the deflection of the voltmeter.

References Cited

UNITED STATES PATENTS 2,285,006  6/1942  Bowser _____ 324—70

FOREIGN PATENTS 557,248  11/1943  Great Britain.

RUDOLPH V. ROLINEC, *Primary Examiner.*

WALTER L. CARLSON, *Examiner.*

M. J. LYNCH, *Assistant Examiner.*